Jan. 12, 1926.
J. H. HAMMOND, JR
1,568,972
SYSTEM OF AEROPLANE CONTROL
Original Filed March 7, 1914
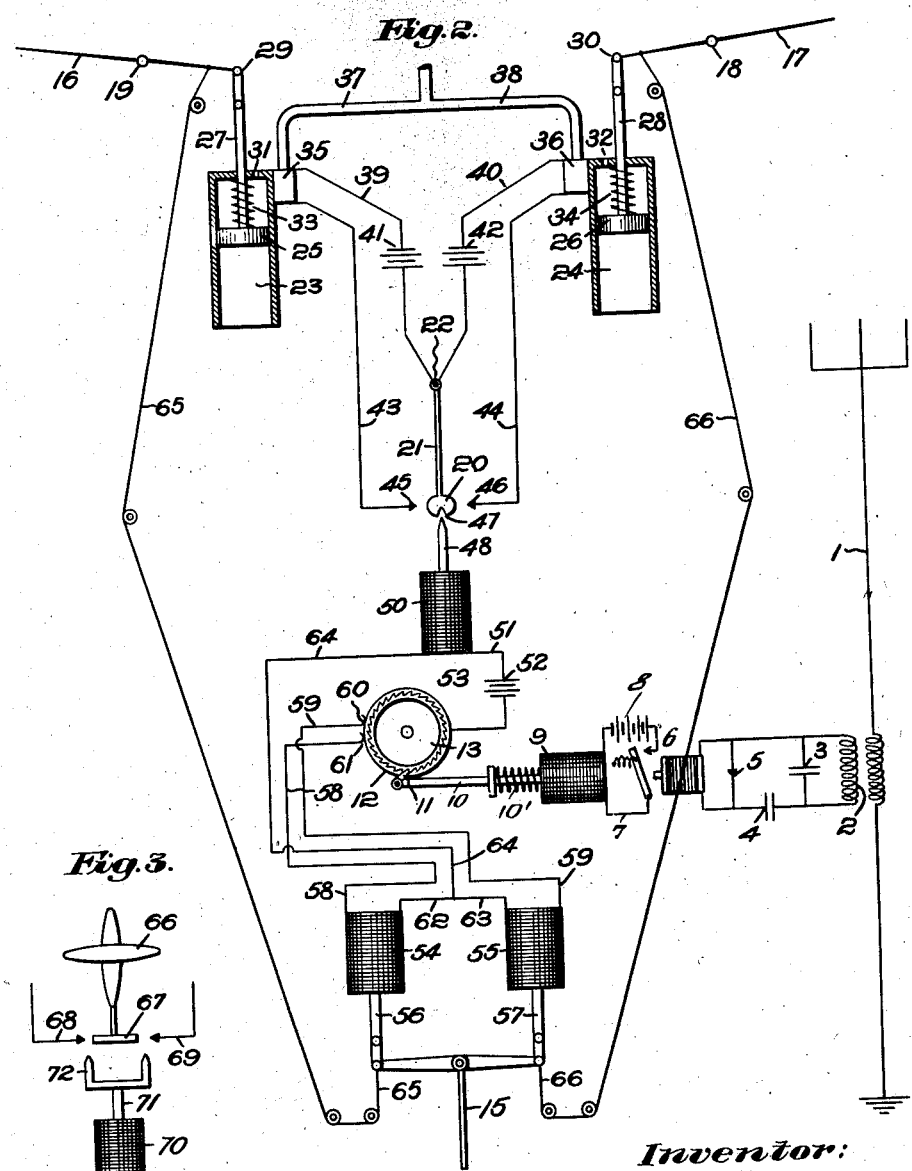
Inventor:
John Hays Hammond, Jr.
by Emery, Booth, Janney and Varney
Att'ys
Witnesses:
Horace A. Crossman
Carl L. Choate Patented Jan. 12, 1926.

1,568,972

UNITED STATES PATENT OFFICE.

JOHN HAYS HAMMOND, JR., OF GLOUCESTER, MASSACHUSETTS.

SYSTEM OF AEROPLANE CONTROL.

Application filed March 7, 1914, Serial No. 823,218. Renewed April 3, 1916. Serial No. 88,723.

*To all whom it may concern:*

Be it known that I, JOHN HAYS HAMMOND, Jr., a citizen of the United States, and a resident of Gloucester, in the county of Essex and State of Massachusetts, have invented an Improvement in Systems of Aeroplane Control, of which the following description, in connection with the accompanying drawings, is a specification, like characters on the drawings representing like parts.

This invention relates to the control of aeroplanes or air crafts at a distance and particularly to the control thereof by radiant energy.

In order that the principle of the invention may be readily understood, I have disclosed a single embodiment thereof in the accompanying drawings, wherein—

Fig. 1 is a front elevation of one type of aeroplane to which my invention may be applied;

Fig. 2 is a view mainly diagrammatic of one form of apparatus for practicing my invention; and Fig. 3 is a detail representing a modified form or embodiment of my invention.

My invention particularly relates to the control of air crafts from a distance by radiant energy, preferably in the form of electromagnetic waves. I provide means, in accordance with the disclosed embodiment of the invention, whereby the steering apparatus can be controlled or governed at a distance by radiant energy. In accordance therewith the steering or rudder means may be turned or moved as desired to keep the craft upon its course or to change its course. The employment of such means alone, however, necessitates the exercise of constant control of the steering mechanism by the operator at the control station in order to rectify errors in the control of the craft due to wind currents and related causes.

An important object of my invention is therefore to provide means for maintaining a definite, predetermined or fixed direction of movement of the aeroplane or air craft, and which will answer immediately to or react against changes of trim in the aeroplane due to wind, currents of rising and sinking air or other atmospheric changes, and from which direction maintaining means the control of the air craft may be relieved by the distant operator who may then by emission of radiant energy from the control station direct the control of the air craft, as for example to turn the same. For the accomplishment of my purpose, I prefer to provide a controller of any suitable nature and which may, for example, take the form of a pendulum or swinging weight or may take the form of a gyroscope. The function of such controller is to keep the air craft on a fixed, definite or predetermined course and to react against changes of trim except at such time as the distant operator desires to change the course, and thereupon modifies the action of the controller upon the craft, as by temporarily terminating the control thereof. I thereby obviate the necessity of constant wave emission from the control station, as for the purpose of compensating for deviations from a straight course due to the phenomena previously referred to or other causes, and thereby greatly minimize the possibility of an enemy determining the wave lengths used in the control of the craft and thereupon interfering with the control thereof.

I have referred to the control of the air craft by radiant energy. While this control may be exercised through any suitable form or nature of radiant energy, I preferably employ mechanism for generating or radiating electromagnetic waves.

Referring to the drawings, and first to Figs. 1 and 2, wherein I have shown a single embodiment of means for carrying out my invention, I have indicated an open, oscillatory receiving circuit at 1, this being connected to the winding 2 of a closed, oscillatory circuit of any suitable type and shown as having therein a condenser 3, a stopping condenser 4 and a suitable detector 5 for electrical oscillations. At 6 I have indicated a sensitive relay or other contact making device. These parts may be of any suitable construction not herein necessary more fully to describe or to indicate.

The relay 6 controls a normally open circuit 7 which is arranged to be energized by a battery 8 and to control a solenoid 9 having a core 10 normally held yieldingly in a given initial position by means of a spiral spring 10' and arranged to be moved toward the solenoid 9 as a result of the energization of the solenoid and to be returned to its initial position by the spring when the solenoid is deenergized.

The head of the solenoid plunger is provided with a pawl or tooth 11 adapted intermittently to engage the teeth 12 of a commutator 13 suitably mounted upon the air craft, as are all the parts herein described. Upon the receipt, therefore, of electromagnetic waves to which the closed oscillatory circuit 2 is responsive, the commutator is moved in a step-by-step manner, so as preferably to move the steering means, herein represented as a vertical rudder and preferably also to move the balancing or stabilizing means.

The body of the air craft I have indicated generally at 14. It may be of any suitable character and may be for example a monoplane or a biplane. It is provided with a suitable motor and propellers, or other suitable means for propulsion, and is also provided with steering means herein represented as a vertical rudder 15 pivoted or secured in any suitable manner to the body in a manner not necessary herein more fully to disclose. The air craft is also provided with suitable balancing or stabilizing means of any suitable type and which I have herein represented as lateral planes 16, 17 pivoted at 18, 19 at or adjacent to the opposite sides of the air craft, and at any suitable points thereat, as for example adjacent the lateral edges of the upper plane. If desired, however, said balancing means may be positioned at any other desired points, as for instance fore and aft of the air craft.

In accordance with my invention, I provide means whereby from the distant control station the movement of the air craft may be governed, inasmuch as the latter is not intended to carry an operator. In order to prevent the necessity for the constant emission of electromagnetic waves or other forms of radiant energy from the distant control station so as to keep the air craft upon its course or to change its course, I provide a controller, the function of which is automatically to govern or move the balancing or stabilizing means and to answer to or react against changes in trim due to wind currents, atmospheric changes, etc. If for any reason the stabilization of the air craft becomes impaired, the controller automatically moves the stabilizing means so as to restore the equilibrium of the air craft. Thus the controller supplies the place of the aeronaut so far as the constant maintaining of the trim is concerned.

In the present embodiment of the invention I have represented the controller as a weight 20 suspended by a wire or other suitable means 21 from a pivotal point 22 upon the body of the air craft. I may provide any suitable means intermediate and operatively associated with said controller and the balancing means herein represented as planes or ailerons 16, 17. For this purpose I preferably provide two cylinders 23, 24, suitably mounted upon the body and having therein pistons 25, 26, the piston rods 27, 28 of which are suitably pivoted at 29, 30 to the planes 16, 17, as for example at their inner ends. The point of connection will, of course, be varied in accordance with the location of said planes, and inasmuch as one or any greater number of balancing planes or means may be employed, I may and preferably will provide a corresponding number of cylinders and associated parts.

Each of said cylinders 23, 24 is preferably formed with an open, lower end and is provided with a small port 31, 32 for the escape of fluid under pressure from the upper end of the cylinders. Surrounding each piston rod is a coil spring 33, 34, tending normally to hold the pistons 25, 26 at or near the upper ends of the cylinders 23, 24. Each of said cylinders 23, 24 is provided with suitable valve mechanism diagrammatically indicated at 35, 36 and by which fluid under pressure and preferably compressed air may be admitted through pipes 37, 38 from any suitable tank or other source of supply not herein shown, but which is suitably located upon the air craft.

While the valves 35, 36 may be operated in any suitable manner, I preferably for that purpose provide electric circuits indicated diagrammatically at 39, 40, each having a battery 41, 42, and each of which is connected with the suspension wire 21 and weight 20 forming a part of each of said circuits. Each circuit has as a part thereof a wire or conductor 43, 44 leading to a point within the range of swinging movement of the weight 20 and there having terminals 45, 46, with which the weight 20 may make contact, so as to close either circuit 39, 40, and thereupon to open the corresponding valve 35, 36, thus admitting fluid under pressure into the proper cylinder 23 or 24. In the described manner, the inner ends of the planes are moved downwardly, thus tilting upward their outer ends. The tension of the springs 33, 34 tends to restore the planes to normal position.

Preferably I provide suitable guides for the weight 20 so that in its swinging movements, it may contact with the terminals 45, 46, and thus through the described connections move the planes or balancing means 16, 17.

The weight 20 is so constructed and mounted that no relative movement or no relative operating movement thereof occurs so long as the predetermined equilibrium of the air craft endures. When, however, the air craft tends to lose its equilibrium and the body thereof is thus titled or moved, the weight 20 contacts as described with the terminals 45, 46, thus moving the proper plane 16 or 17 so as to restore the equilibrium of the air craft. Thus the air craft will be kept upon its course and in equilibrium without the emission of waves from the distant control station, the controller 20 being employed to compensate for sudden changes in the trim of the aeroplane, etc.

When, however, the operator at the distant control station wishes to alter the direction of movement of the air craft, he emits suitable impulses so as through the action of the commutator 13 to neutralize or temporarily terminate or modify the action of the weight 20, and thereby prevent it from making contact with either terminal 45, 46. For this purpose I have represented the weight 20 as having upon its under side a socket 47 with which is adapted to engage the end 48 of a core or plunger 49 of the solenoid 50. Upon energization of the said solenoid 50 the core or plunger 49 thereof is moved upwardly so that its head enters the socket 47 and holds the weight 20, thus neutralizing its action and preventing functioning thereof. The solenoid is positioned in a circuit 51 having a battery 52 and connected in any suitable manner to the commutator, as at 53.

I provide suitable means whereby upon neutralizing or temporarily suspending the functioning of the controller 20, I at the same time impart the desired movements to the steering and other means upon the air craft, so as to change its course in accordance with the desires of the operator at the control station. Preferably I provide means connected with the rudder 15 and also with the planes 16, 17, so that at the same time the weight 20 is rendered nugatory, the rudder and if desired the planes 16, 17 are moved. That is to say, I provide means whereby from a distant control station I may warp the wings as well as turn the rudder. It is not, however, essential to my invention that the rudder and the planes or any of them be moved by the same impulse by which the functioning of the controller 20 is arrested, inasmuch as separate means may be employed for this purpose. Preferably, however, the construction is such that the two operations occur through the action of the same impulse or impulses, which as previously stated may be any form of radiant energy, whether of light, sound or electromagnetic waves.

For that purpose I have represented two solenoids 54, 55, the plungers 56, 57 of which are connected with the vertical rudder 15, so as to move the same in opposite directions. These connections may be of any suitable character not herein necessary more fully to describe. Each solenoid 54, 55 is provided with wires 58, 59 having brushes 60, 61 bearing upon the commutator, so that in the rotation of the latter the circuits are completed so as to energize the proper solenoid. The two solenoids are also provided with wires 62, 63 from which leads a wire 64 connected to the solenoid 50.

In the event that I desire also to move the planes 16, 17, I provide suitable flexible or other connections herein represented as cords 65, 66 leading about suitable guides and to the respective plungers 56, 57, so that as the rudder 15 is turned I may likewise move the desired plane 16 or 17 in accordance with the movement of the rudder. Within the scope of my invention, the planes 16, 17 or either of them, may be moved independently of the rudder 15.

In Fig. 3, I have represented a somewhat modified form of my invention wherein the weight 20 is replaced by a gyroscope indicated generally at 66. The said gyroscope is so mounted that it functions in a predetermined plane or azimuth, and at its lower end it is provided with a contact member 67 by which it may make contact with either terminal 68, 69 corresponding to the terminals 45, 46 shown in Fig. 2. The gyroscope is suitably wired so as to constitute a part of the two circuits to which the terminals 68, 69 pertain, the latter being so mounted and supported that the movements of the craft tending to disturb the equilibrium thereof will cause contact of one or the other terminal 68, 69 with the terminal 67 of the gyroscope, and thus in the manner previously described impart movement to the proper plane 16 or 17.

I employ a solenoid 70 corresponding to the solenoid 50 shown in Fig. 2, and I provide the plunger 71 thereof with an insulated, forked or yoke-like member 72 having beveled or wedge-like portions 73, 74, which upon energization of the solenoid 70 are forced between the terminals 67 and the terminals 68, 69, so as to prevent functioning of the gyroscope in the control of the air craft, as previously described. Upon such termination of the control of the air craft by the gyroscope and preferably by the same impulse as previously described, the steering means and if desired the plane or planes 16, 17, etc. may be moved so as to alter or affect the course of the air craft, it being therefore evident that the controller is temporarily rendered inoperative, so as to permit the turning or steering of the aeroplane from the distant control station.

From the foregoing description, it will be evident that I have provided means not only whereby the air craft may be controlled from a distant station and preferably by radiant energy, so that I may warp the wings or planes and turn the rudder, but I have provided a controller upon the aeroplane, taking the place of the aeronaut and functioning automatically and constantly to preserve the trim of the craft notwithstanding air currents, winds, etc. I have also provided means whereby, from the distant control station, the said automatic controller upon the aeroplane may be temporarily rendered inoperative or nugatory, so that the control from the dstant station may be exercised.

Within the scope of my invention I may apply the system herein described to other moving bodies, and particularly to vessels, such for example as torpedo boats, which may be kept on a predetermined course by a controller, such as a gyroscope, the latter being temporarily rendered inoperative (as in the manner herein described), when the vessel is steered by radiant energy from a distant control station, as by light, sound or electromagnetic waves.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for controlling an aeroplane or air craft at a distance by radiant energy including in combination, an aeroplane or air craft body having balancing or stabilizing means, a controller cooperating with said means and determining the position thereof, and means responsive to radiant energy from a distance to interrupt the action of said controller upon said balancing or stabilizing means.

2. A system for controlling an aeroplane or air craft at a distance by radiant energy including in combination, an aeroplane or air craft body having movable balancing means, a controller cooperating with said means and determining the balancing movement thereof, and means responsive to radiant energy from a distance to modify the action of said controller upon said balancing or stabilizing means.

3. A system for controlling an aeroplane or air craft at a distance by radiant energy including in combination, an aeroplane or air craft body having a movable balancing plane, a controllor associated with said balancing plane to move the same in accordance with balancing requirement, and means responsive to radiant energy from a distance to prevent action upon said plane by said controller.

4. A system for controlling an aeroplane or air craft at a distance by radiant energy including in combination, an aeroplane or air craft body having a movable balancing plane, a controller associated with said balancing plane to move the same in accordance with balancing requirement, and means responsive to radiant energy from a distance to prevent action upon said plane by said controller and to move said plane.

5. A system for controlling an aeroplane or air craft at a distance by radiant energy including in combination, an aeroplane or air craft body having movable balancing means, a controller cooperating with said means and determining the balancing movement thereof, and means responsive to radiant energy from a distance to modify the action of said controller upon said balancing or stabilizing means and to move said balancing or stabilizing means.

6. A system for controlling an aeroplane or air craft at a distance by radiant energy including in combination, an aeroplane or air craft body having rudder means, balancing means for said body, a controller cooperating with said balancing means and determining the balancing movement thereof, and means rseponsive to radiant energy from a distance to prevent action upon said balancing means by said controller and to move said rudder means.

7. A system for controlling an aeroplane or air craft at a distance by radiant energy including in combination, an aeroplane or air craft body having upright rudder means, balancing means for said body, a controller cooperating with said balancing means and determining the balancing movement thereof, and means responsive to radiant energy from a distance to prevent action upon said balancing means by said controller and to move said upright rudder means.

8. A system for controlling an aeroplane or air craft at a distance by radiant energy including in combination, an aeroplane or air craft body having rudder means, a balancing plane for said body, a controller cooperating with said balancing plane and determining the balancing movement thereof, and means responsive to radiant energy from a distance to prevent action upon said balancing plane by said controller and to move said rudder means.

9. A system for controlling an aeroplane or air craft at a distance by radiant energy including in combination, an aeroplane or air craft body having rudder means, balancing means for said body, a pendulous controller cooperating with said balancing means and determining the balancing movement thereof, and means responsive to radiant energy from a distance to prevent action upon said balancing means by said pendulous controller and to move said rudder.

10. A system for controlling an aeroplane or air craft from a distance by radiant energy including in combination, an aeroplane or aircraft body having rudder means, lateral balancing planes for said body, a controller cooperating with said balancing planes and determining the balancing movements thereof, and means responsive to radiant energy from a distance to prevent action upon said balancing plane by said controller.

11. A system for controlling an aeroplane or air craft from a distance by radiant energy including in combination, an aeroplane or aircraft body having rudder means, lateral balancing planes for said body, a controller cooperating with said balancing planes and determining the balancing movements thereof, and means responsive to radiant energy from a distance to prevent action upon said balancing plane by said controller and to move said rudder.

12. A system for controlling an aeroplane or air craft at a distance by radiant energy including in combination, an aeroplane or air craft having movable balancing means, fluid pressure means to move said balancing means, a controller governing the action of said fluid pressure means, and means responsive to radiant energy from a distance to modify the action of said controller relative to said fluid pressure means.

13. A system for controlling an aeroplane or air craft at a distance by radiant energy including in combination, an aeroplane or air craft body having rudder means, movable balancing means for said body, fluid pressure means to move said balancing means, a controller governing the action of said fluid pressure means, and means responsive to radiant energy from a distance to prevent movement of said balancing means through the instrumentality of said controller and to move said rudder.

14. A system for controlling an aeroplane or air craft at a distance by radiant energy including in combination, an aeroplane or air craft having movable balancing means, fluid pressure means to move said balancing means, an electric circuit to determine the action of said fluid pressure means, a controller for said electric circuit, and means responsive to radiant energy from a distance to prevent action upon said balancing means by said controller.

15. A system for controlling an aeroplane or air craft at a distance by radiant energy including in combination, an aeroplane or air craft having movable balancing means, fluid pressure means to move said balancing means, an electric circuit to determine the action of said fluid pressure means, a controller for said electric circuit, and means responsive to radiant energy from a distance to prevent action upon said balancing means by said controller and to move said rudder.

16. A system for controlling an aeroplane or air craft at a distance by radiant energy including in combination, an aeroplane or air craft body having a rudder, movable balancing means for said body, a pendulous controller cooperating with said balancing means and determining the balancing movement thereof, a solenoid to neutralize the action of said controller, and means responsive to radiant energy from a distance to govern the action of said solenoid.

17. A system for controlling an aeroplane or air craft at a distance by radiant energy including in combination, an aeroplane or air craft body having a rudder, movable balancing means for said body, a pendulous controller cooperating with said balancing means and determining the balancing movement thereof, a solenoid having a plunger to engage and restrain the movement of said controller, and means responsive to radiant energy from a distance to energize said solenoid.

18. A system for controlling an aeroplane or air craft at a distance by radiant energy including in combination, an aeroplane or air craft body having a rudder, movable balancing means for said body, a pendulous controller cooperating with said balancing means and determining the balancing movement thereof, a solenoid having a plunger to engage and restrain movement of said controller, a commutator for said solenoid, and means responsive to radiant energy from a distance to move said commutator.

19. A system for controlling an aeroplane or air craft at a distance by radiant energy including in combination, an aeroplane or air craft body having movable balancing means, fluid pressure means to move said balancing means, an electric circuit to determine the action of said fluid pressure means, a controller for said electric circuit, and means responsive to radiant energy from a distance to prevent action upon said balancing means by said controller and to move said rudder and said balancing means.

20. A system for controlling an aeroplane or air craft at a distance by radiant energy including in combination, an aeroplane or air craft body having a rudder, movable balancing means for said body, a pendulous controller cooperating with said balancing means and determining the balancing movement thereof, a solenoid to neutralize the action of said controller, and means responsive to radiant energy from a distance to govern the action of said solenoid and to move said rudder.

21. A system for controlling an aeroplane or air craft at a distance by radiant energy including in combination, an aeroplane or air craft body having a rudder, movable balancing means for said body, a pendulous controller cooperating with said balancing means and determining the balancing movement thereof, a solenoid having a plunger to engage and restrain the movement of said controller, and means responsive to radiant energy from a distance to energize said solenoid and to move said rudder.

22. A system for controlling an aeroplane or air craft at a distance by radiant energy including in combination, an aeroplane or air craft body having rudder means, movable balancing means for said body, a fluid pressure cylinder and piston to which said balancing means is connected and by which its movements are controlled, a controller to determine the admission of compressed fluid to said cylinder, and means responsive to radiant energy from a distance to suspend the functioning of said controller and to move said balancing means.

23. A system for controlling an aeroplane or air craft at a distance by radiant energy including in combination, an aeroplane or air craft body having rudder means, movable balancing means for said body, a fluid pressure cylinder and piston to which said balancing means is connected and by which its movements are controlled, a pendulous controller to determine the admission of compressed fluid to said cylinder, and means responsive to radiant energy from a distance to suspend the functioning of said controller and to move said balancing means.

24. A system for controlling an aeroplane or air craft at a distance by radiant energy including in combination, an aeroplane or air craft body having rudder means, movable balancing means for said body, a fluid pressure cylinder and piston to which said balancing means is connected and by which its movements are controlled, a pendulous controller to determine the admission of compressed fluid to said cylinder, and means responsive to radiant energy from a distance to suspend the functioning of said controller and to move said balancing means and said rudder means.

25. A system for controlling an aeroplane or air craft at a distance by radiant energy, including in combination, an aeroplane or air craft body having balancing means, a controller cooperating with said means and determining the position thereof, and means responsive to radiant energy to modify the action of said controller upon said balancing means.

26. A system for controlling an aeroplane or air craft at a distance by radiant energy, including in combination an aeroplane or air craft body having balancing means, a controller cooperating with said means and determining the position thereof, and means responsive to radiant energy to vary the action of said controller upon said balancing means.

27. The combination with a movable body, of means to stabilize said body with respect to an axis extending substantially longitudinally thereof, and means operative in response to radiant energy to terminate the stabilizing action of said stabilizing means and to rotate said body about an axis extending transversely thereof and normally substantially vertically.

28. The combination with a movable body, of means including a pendulum operative to stabilize said body with respect to an axis extending substantially longitudinally thereof, and means operative in response to radiant energy to terminate the stabilizing action of said stabilizing means and to rotate said body about an axis extending transversely thereof.

29. The combination with a movable body, of means to stabilize said body with respect to an axis extending substantially longitudinally thereof, and means operative in response to radiant energy to terminate the action of said stabilizing means and to rotate said body about an axis extending transversely thereof.

30. The combination with a movable body, of an aileron carried thereby and movable with respect thereto for causing said body to be rotated about an axis extending longitudinally of said body, a rudder carried by said body and movable with respect thereto to cause said body to be rotated about an axis extending transversely of said body, means operatively connecting said aileron and said rudder to cause one to be moved as the result of the movement of the other, stabilizing means arranged to automatically control said aileron and said rudder, and means responsive to radiant energy to modify the action of said stabilizing means and to rotate said body about said transverse axis.

31. The combination with a movable body, of an aileron carried thereby and movable with respect thereto for causing said body to be rotated about an axis extending longitudinally of said body, a rudder carried by said body and movable with respect thereto to cause said body to be rotated about an axis extending transversely of said body, means operatively connecting said aileron and said rudder to cause one to be moved as the result of the movement of the other, stabilizing means arranged to automatically control said aileron and said rudder, and means responsive to radiant energy to modify the action of said stabilizing means and to rotate said body about said transverse axis in either direction.

32. The combination with a movable body, of two balancing elements carried thereby and movable with respect thereto, a rudder carried by said body for steering the same, means operatively connecting said rudder to said elements to cause said elements to be moved with respect to said body in accordance with the movements of said rudder with respect to said body, and means responsive to radiant energy for controlling said rudder.

33. The combination with a movable body, of means carried thereby and movable with respect thereto for rotating said body about an axis extending longitudinally thereof, means carried by said body and movable with respect thereto for rotating said body about an axis extending transversely thereof, means operatively connecting said first-mentioned means with said second-mentioned means so as to cause said first-mentioned means to be moved in accordance with said second-mentioned means, stabilizing means carried by said body and arranged to control said first-mentioned means and said second-mentioned means, and means responsive to radiant energy for modifying the action of said stabilizing means and rotating said body about said transverse axis.

In testimony whereof, I have signed my name to this specification.

JOHN HAYS HAMMOND, JR.